United States Patent
Knight

[19]

[11] Patent Number: 6,006,847

[45] Date of Patent: Dec. 28, 1999

[54] ENDLESS TRACK STRUCTURE FOR LIGHT WHEELED VEHICLE

[76] Inventor: Doyle D Knight, 3750 N. Deer Lake Rd, Loon Lake, Wash. 99148

[21] Appl. No.: 08/802,288

[22] Filed: Feb. 18, 1997

[51] Int. Cl.⁶ .................................................. B62D 55/04
[52] U.S. Cl. ...................... 180/9.26; 180/9.25; 180/9.58; 305/127; 305/135
[58] Field of Search .................................... 180/9.1, 9.21, 180/9.25, 9.26, 9.5, 9.52, 9.54, 9.58, 190, 193; 305/127, 135, 114, 153, 143, 125, 133

[56] References Cited

U.S. PATENT DOCUMENTS

| | | | |
|---|---|---|---|
| 1,238,762 | 9/1917 | Hapeman | 180/9.26 |
| 1,539,582 | 5/1925 | Landry | 180/190 |
| 3,077,238 | 2/1963 | Nelson | 180/9.5 |
| 3,606,496 | 9/1971 | Haycock | 180/9.26 |
| 3,689,123 | 9/1972 | Barbieri | 305/135 |
| 3,722,961 | 3/1973 | Haley et al. | 305/127 |
| 4,448,273 | 5/1984 | Barbieri | 180/9.21 |
| 4,699,229 | 10/1987 | Hirose et al. | 180/9.21 |
| 5,273,126 | 12/1993 | Reed et al. | 180/9.21 |
| 5,388,656 | 2/1995 | Lagasse | 180/9.21 |
| 5,607,210 | 3/1997 | Brazier | 305/135 |

*Primary Examiner*—Kevin Hurley

[57] ABSTRACT

An endless track structure to replace the wheels of an all-terrain vehicle, that is adequately attached to the existing wheel hub by a removable mounting shaft. This provides a non-rigid frame that supports spaced apart synchronized driving cog wheels. This frame has mounted within its upper portion, two hexagon bore anti-friction bearings that slide onto a hexagon shaped thin wall sleeve, allowing the assembled track structure to be installed as a unit. There are spaced idler wheels in front and rear portions of the non rigid frame that support the track. They form a triangular configuration with raised front portion and flat rear portion. A non rigid frame provides interconnected resilient leaf spring supports located in the front and rear of the track.

An endless track maintains its appropriate configuration over the driving cog wheels by the front and rear idler wheels, and under the lower course by spaced apart slider rub bars supported by a flexible frame. An optional intermediate suspension may be substituted for the slider with a pair of spaced apart front and rear intermediate idler wheels at the frame portion.

The ability to adjust the position of the front and rear idler wheels in relation to the bearing support is accomplished by multiple mounting holes in the front and rear leaf spring. This allows the track to be lengthened to the front or rear, and still use the same length endless track.

13 Claims, 12 Drawing Sheets

FIG. 1a
FIG. 1b
FIG. 2
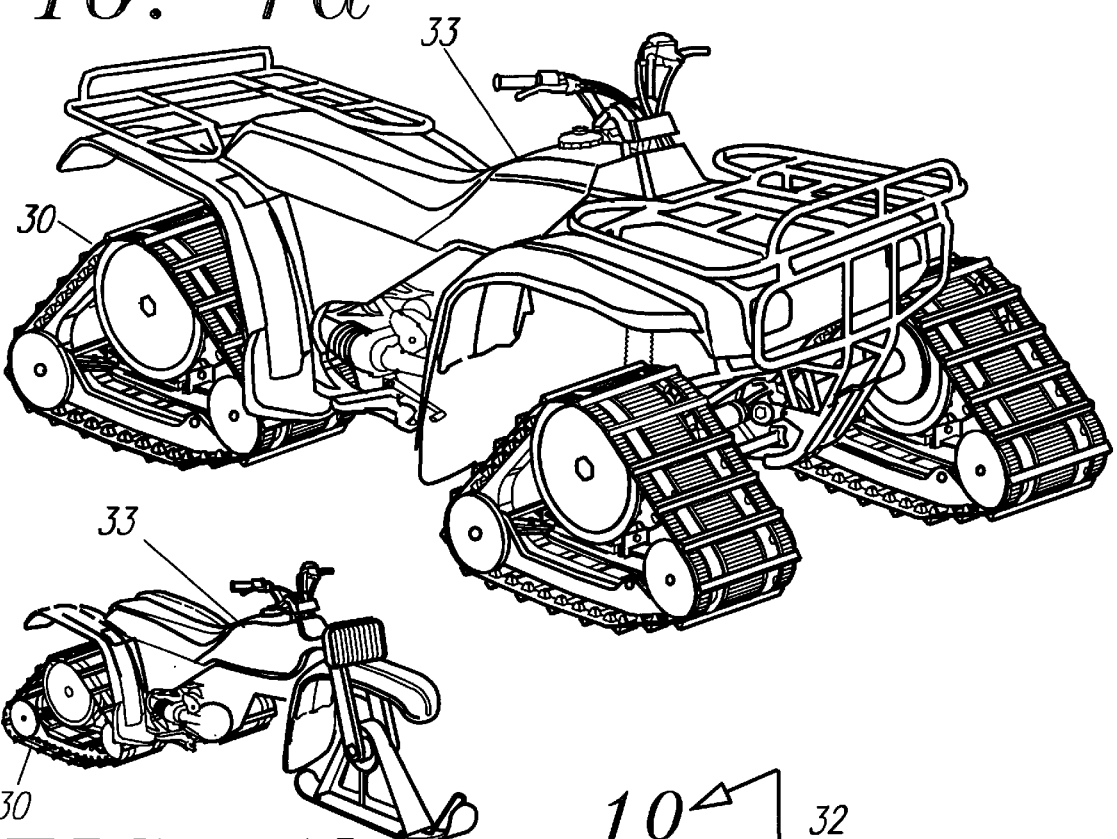
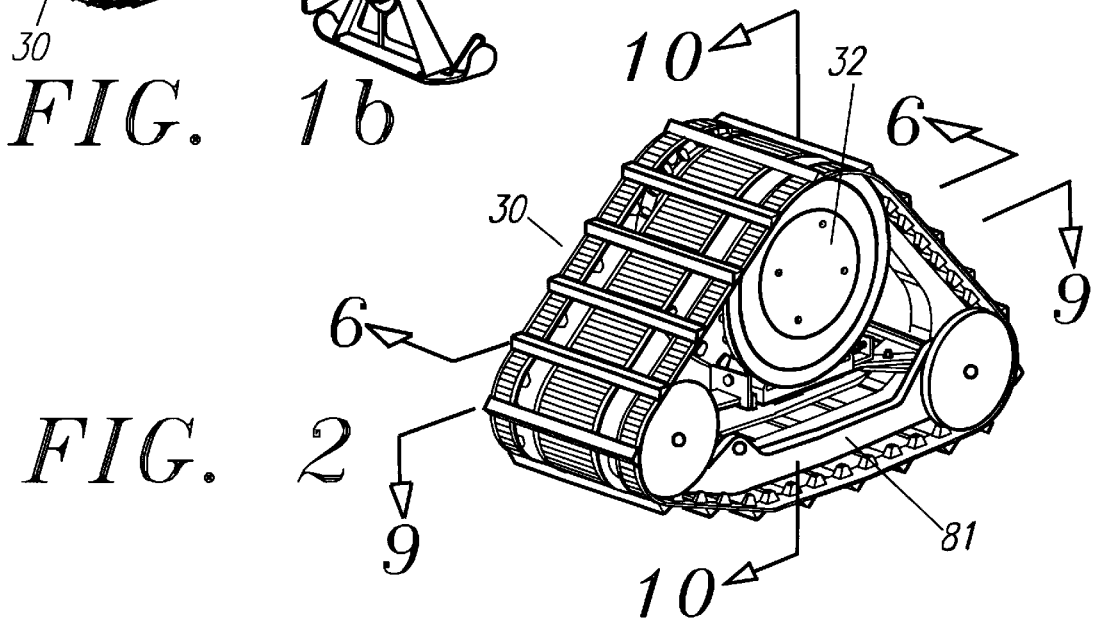

Front Track

Rear Track

Endless Track 99
Not Shown
For Clarity

FIG. 14a
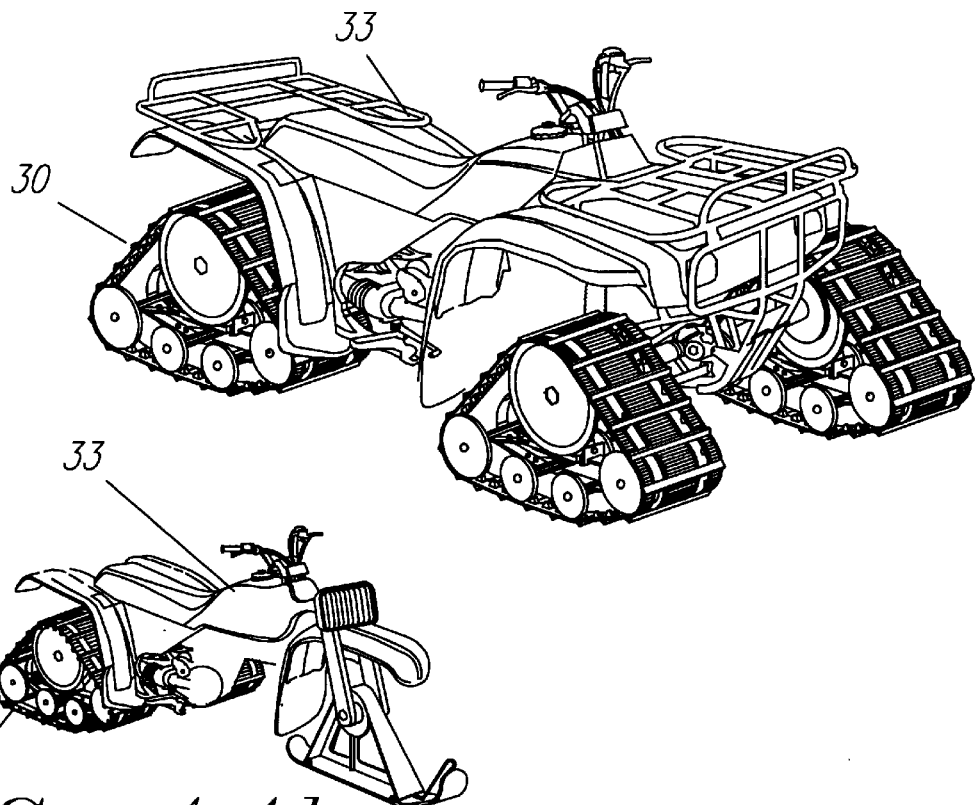
FIG. 14b
FIG. 15
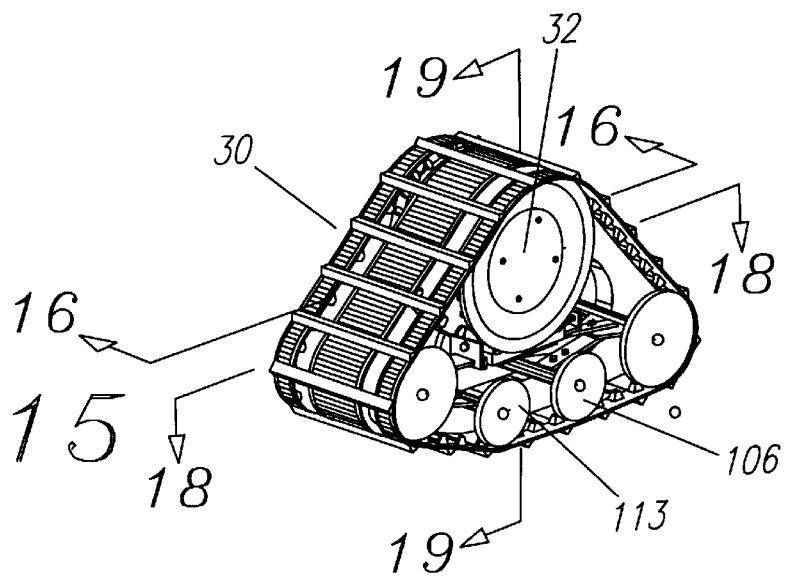

Front Track

Rear Track

ENDLESS TRACK STRUCTURE FOR LIGHT WHEELED VEHICLE

BACKGROUND OF THE INVENTION

This invention relates generally to an endless track structure to replace wheels of a light, as well as other recreational vehicles, and more particularly to such a track structure that has a quick attachment method, a non-rigid movable frame and support method for both edges of an endless track.

The background of track structures for various wheeled vehicles have heretofore become known to adapt those vehicles for use on unstable and irregular surfaces, such as snow, sand, mud and irregular rocky terrain. Through the course of their development, many such devices have become known and their structures have become quite sophisticated to particularly adapt them to use under specialized conditions and with particular vehicles. In general such known track structures have been particularly designed for use with heavy massive vehicles of the automotive and truck type or two wheeled vehicles of the motorcycle type, undoubtedly because of the prevalence of such vehicles in commerce during the developmental period of track devices. Because most of such track devices have been specifically designed for use with a particular vehicle, this rather essentially has limited the use of these devices to those particular vehicles with which they were associated.

In the present day, three and four wheel recreational vehicles characterized by a small size and light weight, both substantially less than similar characteristics of an ordinary automobile, have become popular. Such vehicles normally are not designed for roadway use, but have traditionally been provided with pneumatic tires, commonly of a type to allow use of the vehicle on somewhat unstable and irregular natural surfaces, at least insofar as such use can be had with pneumatic tired vehicles. Pneumatic tires, however, or in fact any rotary type of wheels, do not allow effective use of such vehicles upon various unstable surfaces, such as loose snow of any substantial depth, unconsolidated earth, sand, mud, random spaced rocks and the like, which may be traversed readily by a track type vehicle. My current invention seeks to provide an improved track structure particularly adapted to replace wheels of such light wheeled recreational vehicles to allow vehicle use on unstable and irregular surfaces not adapted to traverse by pneumatic tires. The track structures heretofore used by heavy vehicles of an automotive or truck type have generally provided a rigid frame, bearing mounted drive cogs and idler wheels to define a course about which an endless track moves to support a vehicle on a surface for travel thereon. This type of rigid frame track structure has proven usable in heavier vehicles, especially when operated at low speed with a vehicle having a sophisticated suspension system to absorb shock. Such rigid frame track structures, however, are neither necessary nor desirable for use in track structures for light recreational vehicles and is not effectively usable with such vehicles. My invention provides a nonrigid movable frame that mounts spaced pairs of drive and idler wheels to define the course of an endless track. A primary feature of my invention provides a frame containing interconnected elastically deformable leaf spring elements. Either form of a movable frame allows relative motion between the driving self-cleaning cog wheels and various pairs of idler wheels supporting the endless track to absorb shock and maintain tension upon the track to keep it in its normal course and prevent accidental dislodgement, all to distinguish this frame from rigid frame structures which accomplish neither of these features. For a track structure that replaces pneumatic tires on a lightweight recreational vehicle to be practical, it must provide connecting methods that allow simple and easy installation or mounting on a carrying vehicle in a short time period by unskilled persons.

Previously known track structures have provided methods for releasable attachment to the existing hub structure of a vehicle that releasably mounts a wheel carrying a pneumatic tire. Most of those prior mounting methods have included an integral part of a track structure that either is not or cannot be easily removed to accommodate the mounting process, but rather the entire track structure has had to be mounted on the vehicle hub as a single unit. Some prior track structures have even had multiple support from the vehicle frame as well as a drive shaft. By reason of this, it has been commonly difficult to mount such track structures on a wheel hub because the track structure itself is large and heavy making it hard to position and to make access to the hub area difficult and inconvenient when the track structure is in position for mounting on a hub. Because of the difficulties in mounting, most prior track structures have usually been designed to be mounted for use for longer periods of time which is not desirable for light recreational vehicles as they are more desirable to change back and forth from wheels to tracks as the seasons or conditions would dictate. My invention solves this problem by providing a releasably interconnected shaft that is easily and simply removable from the track structure to allow the shaft to be separately mounted on a wheel hub with simple and easy access to the hub during mounting, and the endless track structure then reinstalled on the shaft after the shafts mounting on the hub. This feature distinguishes my invention from the prior art devices requiring mounting of an entire endless track device on a wheel hub as a single entity. Many prior track devices have provided particular driving cogs associated with particular endless tracks to drive those tracks from a medial position. This type of track structure has proven usable with heavier automotive type vehicles because of the weight of the vehicle, and especially when the vehicle has sophisticated suspension methods and is operated at relatively low speeds, but such structures are not well adapted for use with light recreational vehicles commonly without sophisticated suspension means and operated at higher speeds. The endless tracks used in all track structures have significant width and when they are driven from a medial position, especially at higher rates of speed, where is a substantial tendency, probably because of leveraged forces caused at the track edges, for the track to become dislodged from its normal course and eventually become separated from its support structure. My invention solves this problem by providing two spaced opposed driving cog wheels, with self-cleaning cogs on their interior peripheral surfaces facing each other, to provide simultaneous synchronous driving support for a track simultaneous at each of its side edges. This feature provides substantially more stability to maintain a track in its normal course and prevent accidentally loosening even at relatively high speeds. This structure also provides an additional benefit in allowing the use of track material that is presently available in commerce for use with ordinary snowmobiles, as such material commonly provides lug structures at its two side edges for driving support of the type required by my invention. Thusly existing endless track material and driving lugs presently commercially available, incorporating the latest state-of-the-art technology and lower cost in my invention.

Prior endless track structures generally have not been particularly concerned with the lower support course of the track because with heavier vehicles operating at relatively low speeds, the configuration did not cause any particular problem so long as there was sufficient track area to support the vehicle upon the surface over which it traversed. In this track structure, which is designed for use on light vehicles at relatively high speeds, it has been found desirable that the forward portion of the track course must be raised somewhat above the rearward flat portion, to help transfer the flexibility of the front portion of the track frame to the terrain and obstacles being traversed and also prevent the problem that the track will tend to accumulate and move snow, mud or debris in front of the track and the entire track structure will tend to move somewhat downwardly into a supporting surface. Either of such happenings will restrict motion of the track structure and tend to increase the probability of track dislodgement. Therefore the forward most pairs of idler wheels on the frame are at a spaced distance above the rearward pair of idler wheels defining the flat course of the track structure in its rearward part, and provide means to guide the track in a regular angulated course from the forward idler wheels to the rearward flat portion. Prior track structures generally have not provided any articulating or elastically resilient frame linkage between wheels defining the endless track course to aid in maintaining the track in a taut condition about its course. In general, this is not practical with heavier vehicles as the weight of the vehicles themselves would create too great a tension on the endless track to allow its effective operation. This invention, however, which operates on lighter recreational vehicles, does provide such linkage and in so doing is more efficient in maintaining the endless track in its normal course without dislodgement, especially at high speeds, than is the non-movable frame structure of prior art devices. The particular type of movable frame structure of this invention also allows inclusion of traditional and special mechanical tension adjusting mechanisms to accommodate both a long term and short term changes or variations in belt length and tension. This invention resides not in any one of these individual features, but rather in the overall combination of all of the particular structures and functions necessarily included as herein set forth and claimed.

BRIEF SUMMARY OF INVENTION

My invention provides an endless track structure to replace wheels of light three or four wheeled recreational vehicles for travel on irregular and unstable surfaces. A mounting shaft defines in its inner end a hub for releasable mounting on the studs of a wheel hub of a vehicle. The hexagon mounting shaft irrotatably carries two driving cog wheels, spaced by two hexagon bore antifriction bearings therebetween, and are mounted on a hexagon thin wall sleeve so as this sub assembly can be mounted to the rigid fame beam and then with all the parts assembled are releasably maintained on the hexagon mounting shaft by a threadedly engaged slotted nut and cotterpin at the outer end of the mounting shaft. The rigid frame beam, with the hexagon bore antifriction bearings mounted in its medial portion, supports a forward idler shaft with antifriction bearing mounted spaced apart idler wheels in its lateral portions. The rigid frame beam, in a medial position has mounted in its forward end and in its rearward end, pivotally mounted spaced apart rub bar struts, which in their lower portions pivotally support similar spaced elongated rub bars having upturned forward portions, with a mounting shaft between each strut structure and with the mounting shafts positioning the rub bars in a downward and rearward position beneath the rigid frame beam mount. The rearward parts of each rub bar with adjustable slots carry a rearward idler shaft with mounted spaced apart rear antifriction mounted idler wheels to support the lower rearward course of an endless track. An endless track having friction devices on its outer surface and driving lugs on its inner surface, in spaced relationship along each of its side edges, is carried about the course defined by the driving cogs, idler wheels, and rub bars to form a somewhat triangular configuration with a raised lower forward apex. The rub bars may optionally be replaced with four idler wheels to support the lower intermediate portion of the endless track with less friction in dry conditions than would be caused by the rub bars which work best in snow. A species of flexible frame provides a central beam of adjustable length formed by two leaf spring elements interconnected by a medial rigid frame beam structure projecting upwardly therefrom for rotary support on the medial bearing shaft. The shafts carrying the opposed paired forward and rearward idler wheels are carried, respectively, by the forward and rearward ends of this central spring beam. This optional species of this invention has no rub bars, but downwardly secondary springs depend angularly and inwardly from each end of the central rigid frame beam to support shafts paired opposed medial forward and rearward idler wheels positioned between the front and rear idler wheels to define the endless track course therebetween. In creating such a device, it is: A principal object to provide an endless track structure to replace pneumatically tired wheels on three or four wheeled light recreational vehicles to allow use of such vehicles on unstable and irregular surfaces.

A further object of this invention is to provide such a structure that has a mounting shaft, to be releasably carried by the wheel hub of a vehicle to be serviced, that is readily removable from the endless track structure to allow quick and easy mounting on a vehicular hub and subsequent mounting of the track structure on the mounting shaft without the need of shear keys and keyways.

A further object of this invention is to provide such a device that has paired spaced driving cogs and idler wheels to drive and support an endless track structure simultaneously at each of its side edges.

A still further object of this invention is to provide such a device that has a movable frame structure interconnecting the drive wheel shaft and idler wheel shafts so that all of these shafts may move relative to each other with a bias to tension a track thereabout with the tensioning and length adjustment being made possible from either the front or the rear and to absorb shock.

A further object of this invention is to provide such an endless track structure that maintains an elevated forward portion of the track above an underlying surface supporting the rearward portion of the lower track course to aid passage of the track over soft, unstable surfaces to be traversed.

A still further object of this invention is to provide such a structure that is operative with existing drive cogs and elastomeric snowmobile tracks that drive from the side edges.

A further object of this invention is to provide a species of such device wherein the frame beam is formed of elastically resilient leaf spring material and the main beam carries at least two supports one at the front and one at the rear, for a pair of rub bars to aid in defining the lower course of an endless track between the front and rear idler wheels without the use of intermediate idler wheels.

A further object of this invention is to provide a species of such device wherein the frame beam is formed of elastically resilient leaf spring material and the main beam carries at least two depending, angularly and inwardly extending sets of intermediate idler wheels to aid in defining the lower course of an endless track between the front and rear idler wheels without use of rub bars.

A still further object of this invention is to provide new and novel design to make the track to be adjustable both at the front and at the rear for both length and endless track tension adjustment with the same length endless track.

A still further object of this invention is to provide such a track structure that is of new and novel design, of rugged and durable nature, of simple and economic manufacture and otherwise well suited to the uses and purposes for which it is intended.

Other and further objects of this invention will appear from the following specification and accompanying drawings which form a part thereof. In carrying out the objects of my invention, however, it is to be understood that its essential features are susceptible to change in design and structural arrangement with only one preferred embodiment and one alternate embodiment being illustrated in the accompanying drawings as is required.

BRIEF DESCRIPTION OF THE SEVERAL VIEWS OF THE DRAWINGS

FIG. 1a is a pictorial view of a four wheeled and FIG 1b a three wheeled All Terrain Vehicle both of which are equipped with a preferred embodiment of the invention showing slider rub bars supporting the medial lower portion of the endless track.

FIG. 2 is a pictorial view of the preferred embodiment as shown in FIG. 1a and FIG. 1b.

FIG. 14a is a pictorial view of a four wheeled and FIG. 14b of a three wheeled All Terrain Vehicle equipped with an optional embodiment of the invention showing intermediate idler wheels in place of the rub bars for support and defining the lower path of the endless track.

FIG. 15 is a pictorial view of the optional embodiment shown in FIG. 14a and FIG. 14b.

DETAILED DESCRIPTION OF THE INVENTION

Figure 3:
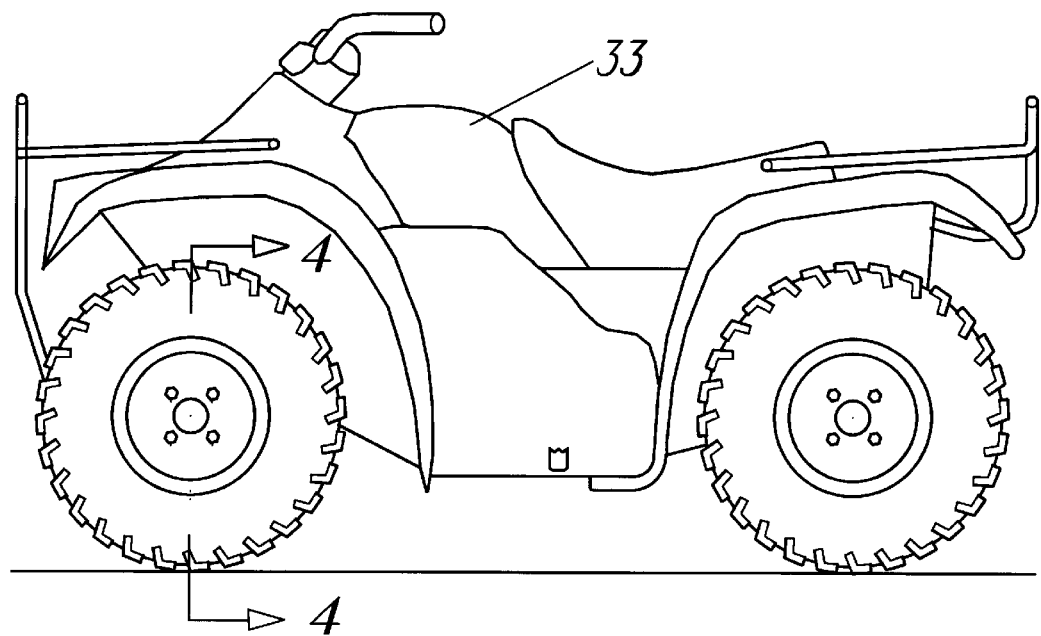
FIG. 3 is a side view of an All Terrain Vehicle factory equipped with tires.
Figure 4:
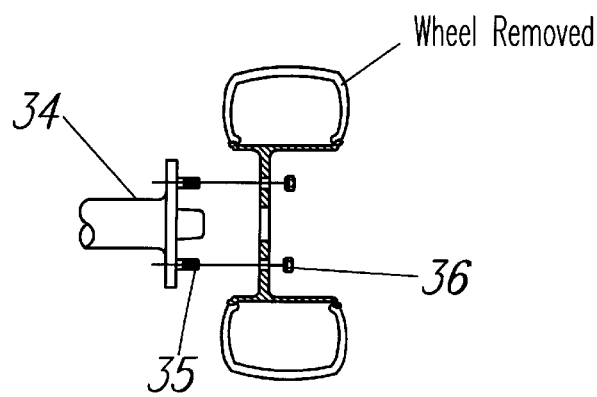
FIG. 4 is a sectional view of the wheel hub and removed wheel taken along line 4—4 as shown in FIG. 3.
Figure 5:
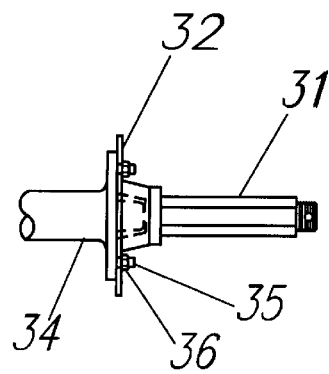
FIG. 5 is a side view of the wheel hub with the hexagonal mounting shaft installed.
Figure 10:
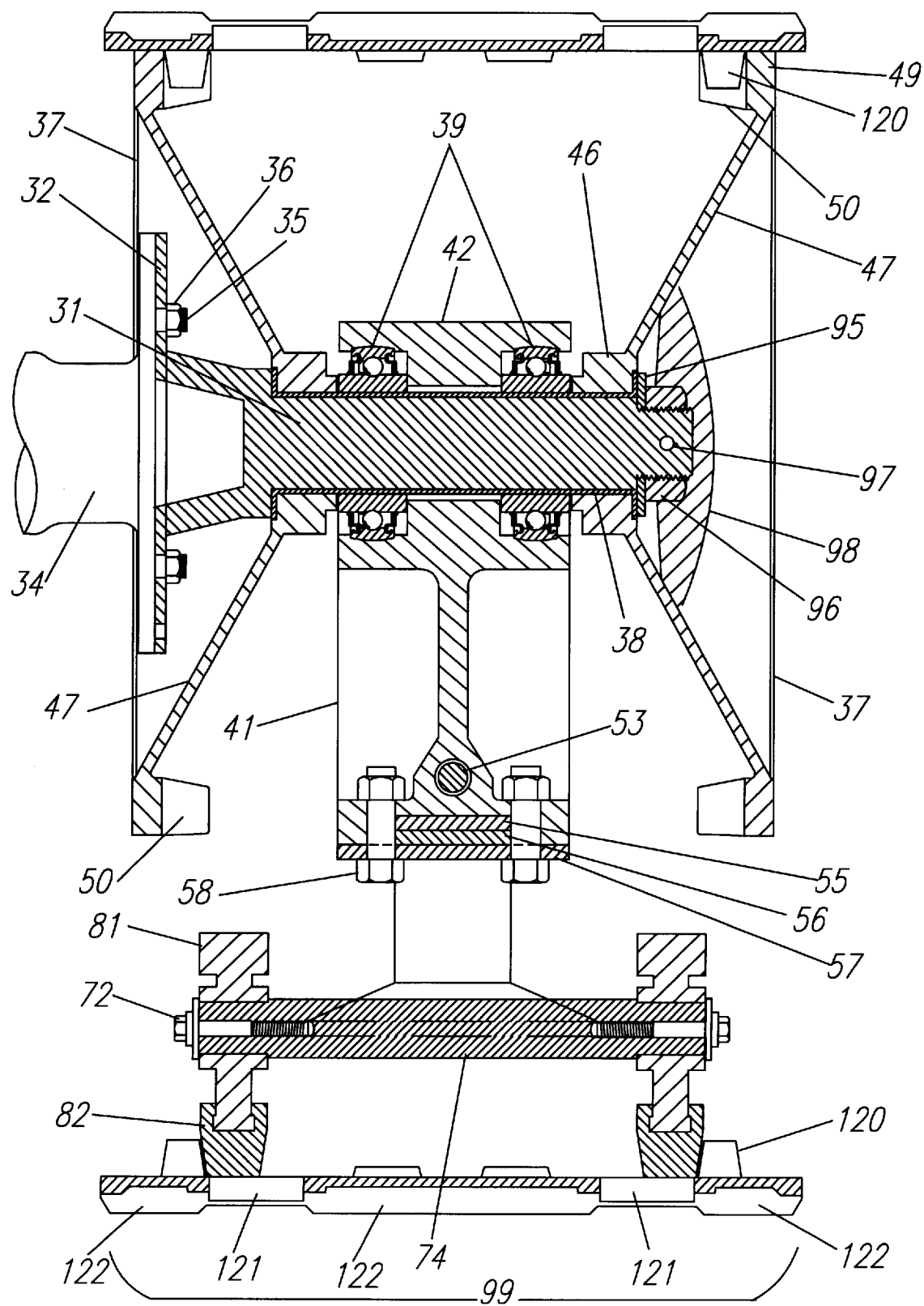
FIG. 10 is a vertical sectional view of the preferred embodiment as taken along the line 10—10 in FIG. 2.
Figure 11:
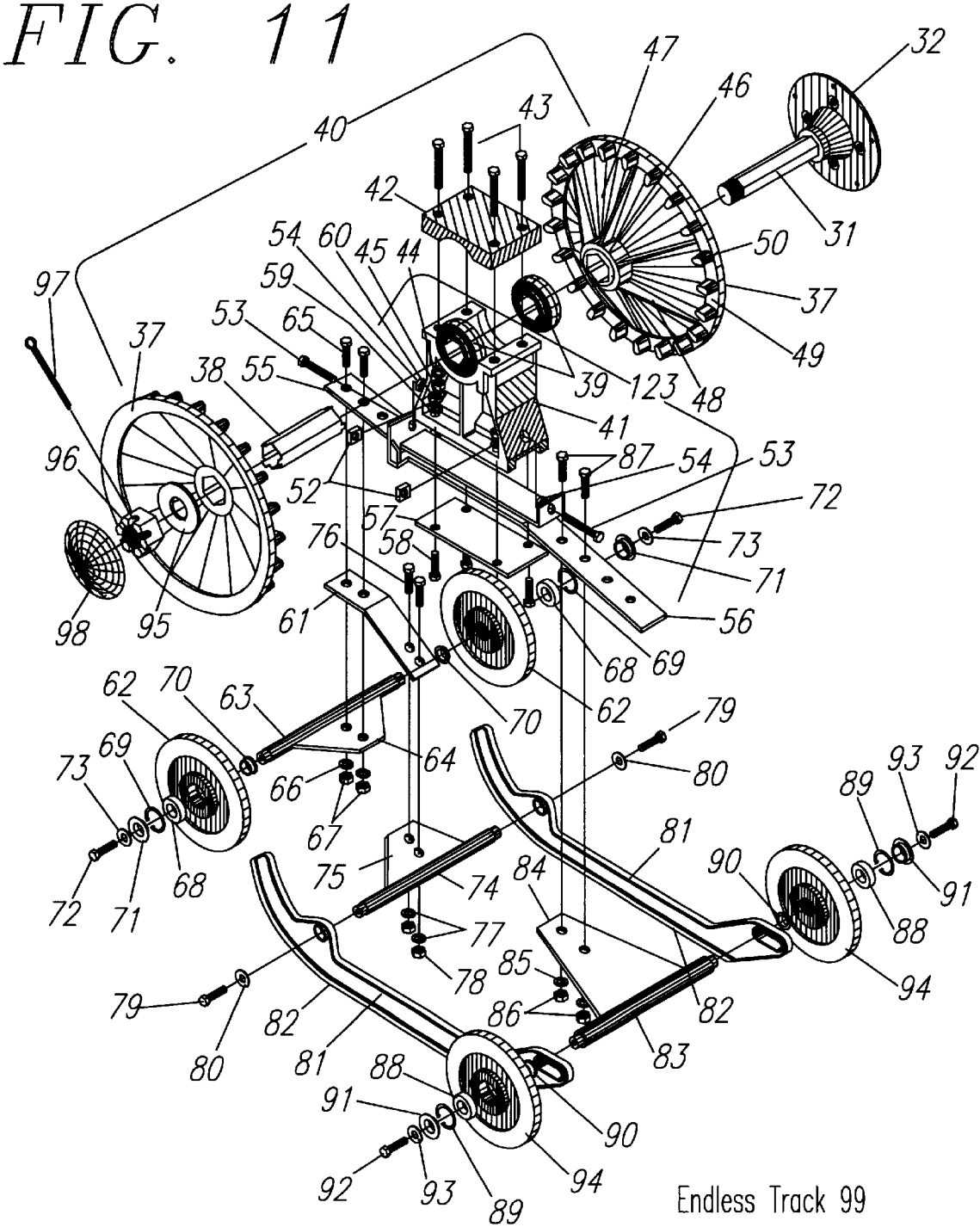
FIG. 11 is an exploded pictorial view of the preferred embodiment of the track assembly showing the slider rub bars but does not show the endless track for clarity.

The drawings show the preferred embodiment of the track laying attachment 30 that are constructed according to the invention and that constitutes the best methods of the invention currently known to the applicant. The attachment 30 includes a mounting shaft 31 showing the preferred form of the shaft being hexagonal in shape and has a mounting flange 32 at its inner end adapted to be secured to a wheel hub of a vehicle, such as the All Terrain Vehicle (ATV) 33 shown in FIG. 3. With the wheels removed from the ATV's wheel hub as shown in FIG. 4. When it is so secured, the mounting shaft 31 rotates with the wheel hub as shown in FIG. 5. FIG. 3 also shows an embodiment in which the mounting flange 32 extends radially outwardly from the inner end of the mounting shaft 31. A portion of a typical ATV wheel hub 34 is shown in FIG. 4, FIG. 5, FIG. 9 and FIG. 10. The wheel hub 34 has projecting studs 35 onto which a wheel would be mounted and secured by nuts 36. The preferred mounting shaft 31 is mounted in the same manner. To accomplish this, the studs 35 are placed through holes provided in the mounting flange 32 so that they protrude from the outer surface of the flange 32. The mounting shaft 31 is then tightly secured to the hub 34 by placing the nut's 36 on the protruding ends of the studs 35 and tightening them against the outer face of the flange 32. In FIG. 10 a driving cog wheel 37a is longitudinally slid onto a hexagon shaped thin wall sleeve 38 which has a tab on three alternating facets and at both ends, then the two hexagon bore antifriction bearings 39 are slid onto the hexagon shaped thin wall sleeve 38 followed by the second driving cog wheel 37b. This sub assembly 40 as shown in FIG. 11 is then placed onto the track supporting rigid frame beam 41 with the two hexagon bore antifriction bearings 39 setting into tight fitting recesses that are cast into the top of the track supporting rigid frame beam 41. The two hexagon bore antifriction bearings 39 are then capped with a cast light weight metal cover 42 and secured with bolts 43, lock washers 44 and hex nuts 45. After the drive cog wheel assembly 40 is secured the three tabs, which are located on both ends of the hexagon shaped thin wall sleeve 38, are bent over against the face of the driving cog wheel hubs 46. In FIG. 11 the driving cog wheel 37 is cast in one piece of a light weight metal with a hexagon bored hub 46, a solid dished web 47 with evenly spaced stiffening ribs 48 for handling the torsion and bending forces that are generated from the driving torque and the terrain being traversed. These stiffening ribs 48 face inwardly giving a smooth surface facing to the outside of the solid dished web, featuring a safe snag free surface. The driving cog wheel 37 also includes an annular stiffening rim 49 centrally located on the extreme outside of the dished web 47 to which the cog projections 50 are attached to the inside, facing to the same side as the projecting side of the driving cog wheel hub 46.

Figure 8:
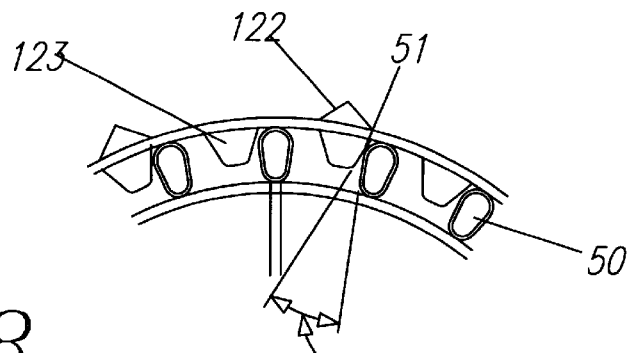
FIG. 8 is a partial view of the driving cog wheel showing the engagement of the driving cog wheel cogs and the endless track lugs, showing the relief incorporated in the shape of the cogs to extrude unwanted material buildup in the contact areas.
Figure 9:
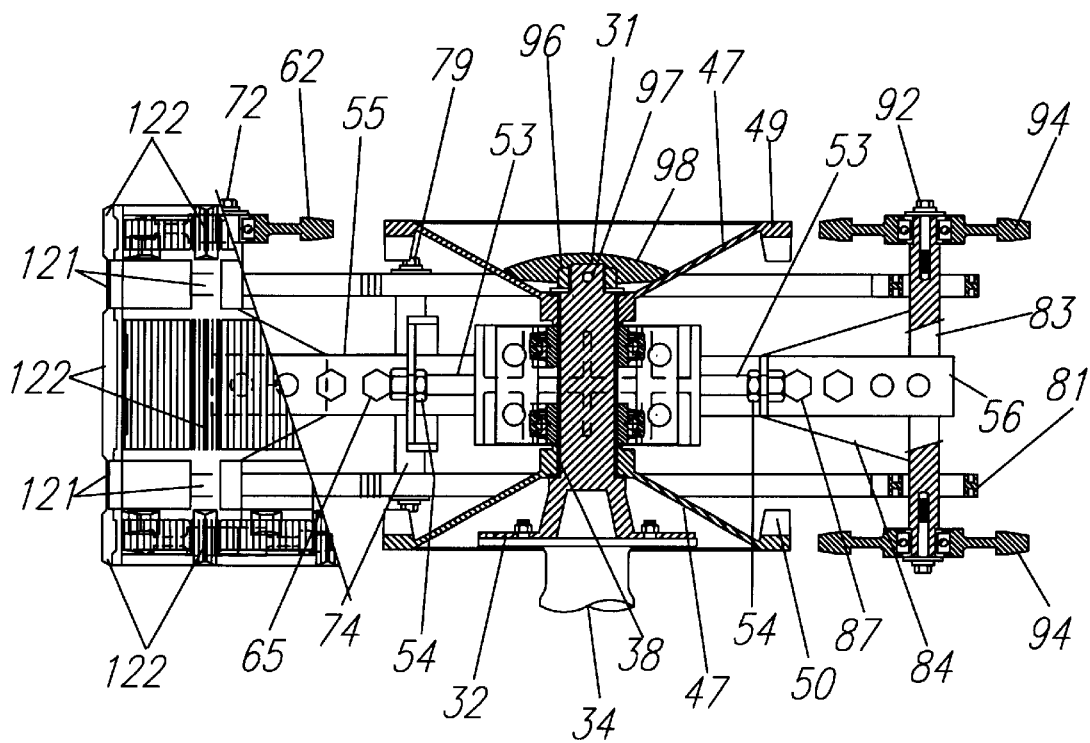
FIG. 9 is a sectional plan view of the preferred embodiment as taken along the line 9—9 in FIG. 2.

The driving cog wheel 37 has evenly spaced apart, endless track lugs 120 receiving projections or cogs 50 at its periphery. These cog projections 50 as shown in FIG. 8 have a bearing surface 51, each of which is rounded at its periphery to guide the endless track drive lugs 120 of the endless track 99 into the space between the cog projections 50 with suitable relief to cause any snow or other compressible material to be squeezed out and fall through the space and down onto the endless track 99 area below and inhibiting the buildup of snow or other compressible material on the cog projections 50.

Figure 6:
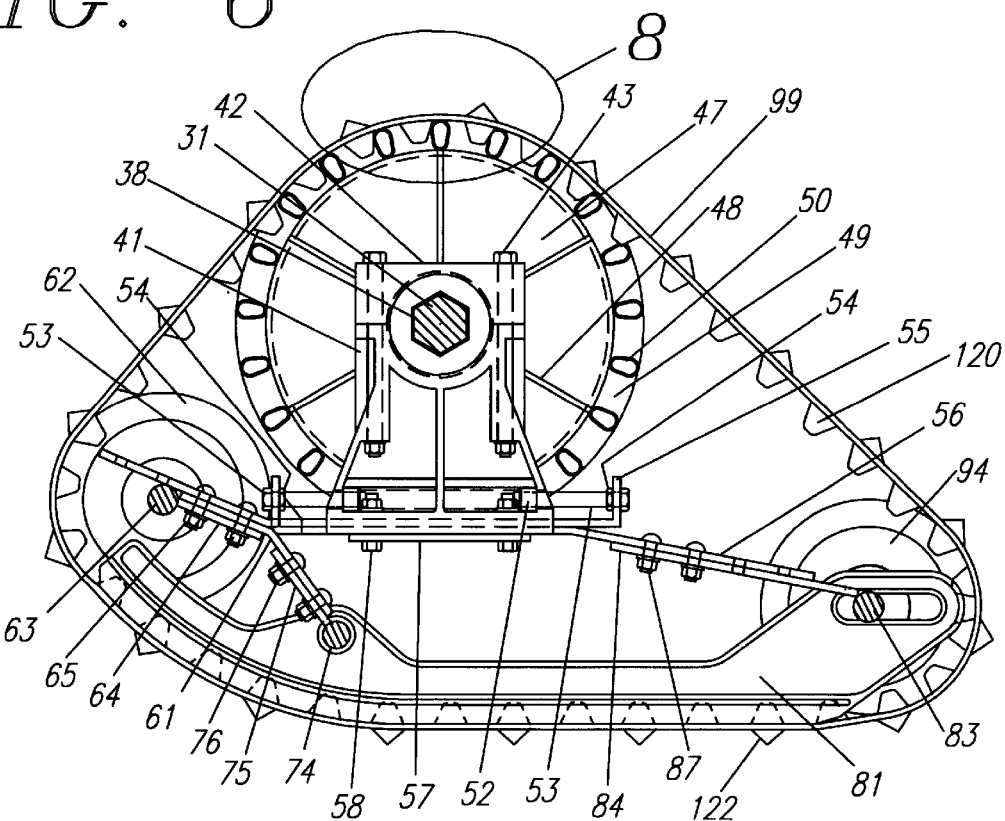
FIG. 6 is a side elevational section of the preferred embodiments taken along line 6—6 as shown in FIG. 2.

The rigid frame beam 41 then has attached to the bottom of it leaf spring mounts 55 and 56 with a clamp plate 57 secured with bolts 58, lock washers 59 and hex nuts 60 as shown in FIG. 6, FIG. 10 and FIG. 11. The rigid frame beam 41 has a block out at the front and rear of it to receive a square nut 52, then rear leaf spring 55 with its front end passed through a slotted hole in the front end of leaf spring 56 are then set into a tight fitting longitudinal slot in the bottom side of the rigid frame beam 41 with the clamp plate 57 secured over them and bolted to the rigid frame beam 41 with bolts 58. Through a hole in the rear end of the rear leaf spring 55, an endless track 99 tension adjusting bolt 53 with a hex jamb nut 54 is threaded and the adjusting bolt 53 passes through a hole in the rear end of the rigid frame beam 41 and is threaded into the square nut 52. Through a hole in the front of the leaf spring 56, an endless track 99 tension adjusting bolt 53 with a hex jamb nut 54 is threaded and then the adjusting bolt 53 passes through a cast hole in the front end of the rigid frame beam 41 and is threaded into the square nut 52. To the front end of the leaf spring 55 a connecting leaf spring 61 in combination with the front idler wheels 62 and mounting shaft 63 with mounting plate 64 are connected using the bolts' 65, lock washers 66 and hex nuts 67. The front idler wheels 62 with antifriction bearings 68, snap rings 69, inner spacer 70 and outer spacer 71 are secured to the ends of the front idler mounting shaft 63 using the bolt's 72 and flat washers 73 that are threaded into drilled and tapped holes in the ends of the front idler mounting shaft 63.

As the preferred embodiment for the bottom intermediate support of the endless track 99 we have attached to the rear of connecting leaf spring 61 strut shaft 74 and mounting plate 75 that connects to the front end of the slider rub bars 81 by means of bolts 76, lock washers 77 and hex nuts 78. The slider rub bar 81 connects to the ends of the strut shaft 74 using bolts 79 and flat washers 80 by threading into tapped holes in the ends of the strut shaft 74. The slider rub bars 81 are cast from light weight metal with a machined polymer plastic rub surface 82 slid onto receiving ribs on the slider rub bars 81 as shown in FIG. 10 and FIG. 11.

The rear leaf spring mount 56 has attached to its rearward end by means of bolts 87, lock washers 85 and hex nuts 86, a rear idler shaft 83 with mounting plate 84. The ends of the rear idler shaft 83 connects to the rear of the slider rub bars 81 by passing through longitudinally elongated slots. The rear idler shaft 83 passing through the elongated slot and having the rear idler wheels 94 with antifriction bearings 89, snap rings 89, inner spacer 90 and outer spacer 91 are secured to the ends of the rear idler shaft 83 using the bolt's 92 and flat washers 93 that are threaded into drilled and tapped holes in the ends of mounting shaft 83.

With the endless track 99 tension take up in there total retracted positions that is the adjusting bolts 53 in there fullest extended out positions the endless track 99 can now be installed onto the track frame assembly by sliding the endless track 99 over the driving cog wheels 37, front idler wheels 62, rear idler wheels 94 and the slider rub bars 81 simultaneously.

As shown in FIG. 14 and FIG. 15 the All Terrain Vehicles show the track unit 30 with an optional embodiment for the bottom intermediate support of the endless track 99 that replaces the slider rub bars. To the rear of connecting leaf spring 61 is attached the front intermediate idler wheels 113, front intermediate idler mounting shaft 74 with mounting plate 75 and bolted by means of bolts 76, lock washers 77 and hex nuts 78. The front intermediate idler wheels 113 connect to the ends of the front intermediate idler wheel shaft 74 with antifriction bearings 114, snap rings 115, inner spacer 116 and outer spacer 117 which are secured to the front intermediate idler shaft 74 using the bolt's 119 and flat washers 117 that are threaded into drilled and tapped holes in the ends of idler shaft 74. To the rear of leaf spring 56 is attached the rear idler wheels 94 mounting shaft 83 with mounting plates 84 and 100 by means of bolts 87, lock washers 85 and hex nuts 86. The rear idler wheels 94 connect to the ends of the rear idler wheel mounting shaft 83 with antifriction bearings 88, snap rings 89, inner spacer 90 and outer spacer 91 are secured to the mounting shaft 94 using the bolt's 92 and flat washers 93 that are threaded into drilled and tapped holes in the ends of the rear idler wheel mounting shaft 83. To the front of mounting plate 100 which is attached to the front of mounting plate 84 is attached the rear intermediate idler wheels 106 mounting shaft 101 with mounting plate 102 by means of bolts 103, lock washers 104 and hex nuts 105. The rear intermediate idler wheels 106 connect to the ends of the rear intermediate idler mounting shaft 101 with antifriction bearings 107, snap rings 108, inner spacer 109 and outer spacer 110, which are secured to the mounting shaft 101 using the bolt's 112 and flat washers 111 that are threaded into drilled and tapped holes in the ends of rear intermediate idler mounting shaft 101.

Figure 7A:
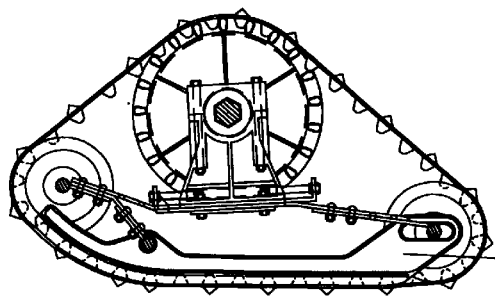
FIG. 7a is a side view of a front track assembly showing the slider rub bars and the adjustability of the frame to allow the same endless track to be used for the front location.
Figure 7B:
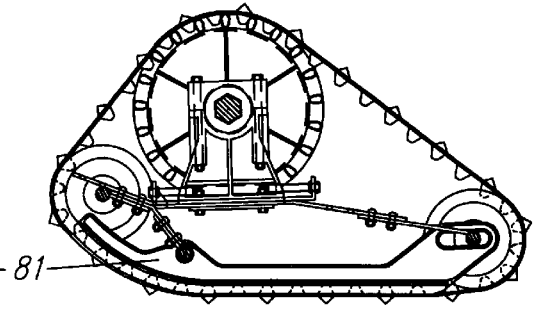
FIG. 7b is a side view of a rear track assembly showing the slider rub bars and the adjustability of the frame to allow the same endless track to be used for the rear location.
Figure 17A:
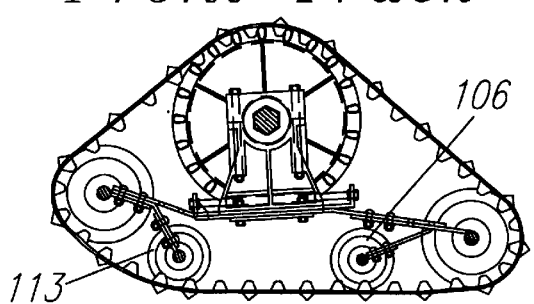
FIG. 17a is a side view of a front track assembly showing the optional bottom intermediate idler wheels and the adjustability of the frame to allow the same endless track to be used for the front locations.
Figure 17B:
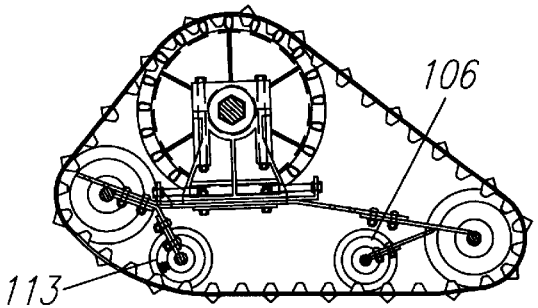
FIG. 17b is a side view of a rear track assembly showing the optional bottom intermediate idler wheels and the adjustability of the frame to allow the same endless track to be used for the rear locations.
Figure 18:
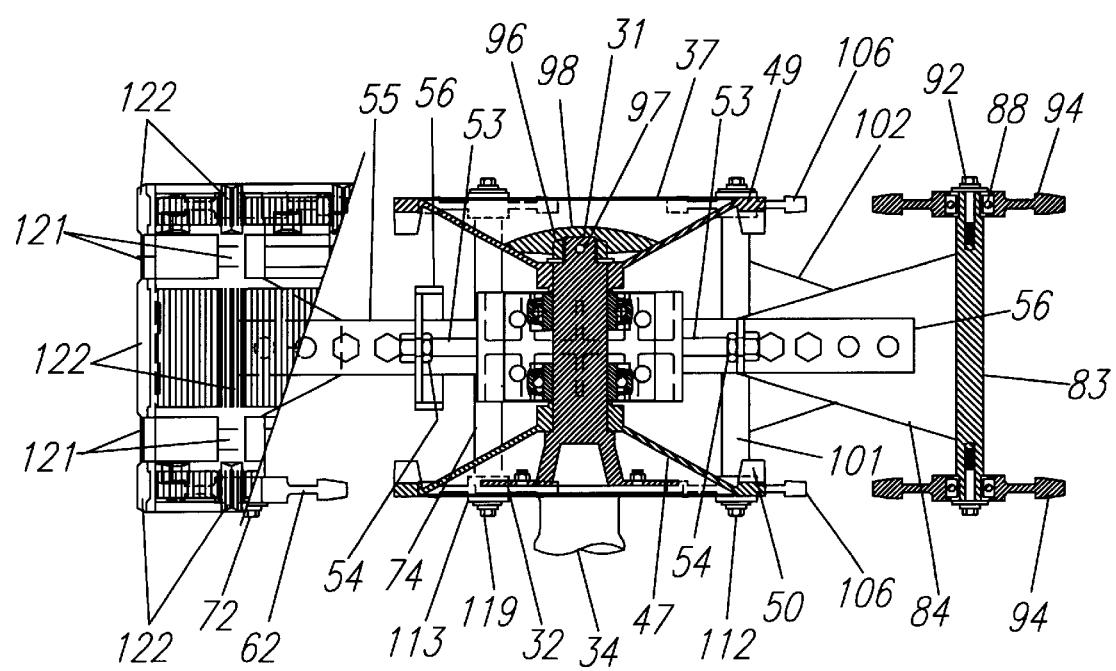
FIG. 18 is a sectional plan view of the optional embodiment as taken along the line 18—18 in FIG. 15.

The endless track 99 tension take-up feature is accomplished by the leaf spring mount 55 for the front and leaf spring 56 for the rear, by tightening the adjusting bolts 53 which pass through the cast holes in the ends of rigid frame beam 41 and are threaded into the square nuts 52 which are mounted in cast block outs located in the front and rear of the rigid frame beam 41 and are locked from unwanted loosening with the hex locking jamb nuts 54. The two extra mounting holes in the front end of the leaf spring 55 are to allow the front idler wheel 62 with its mounting shaft 63 to move forward and bolt into the front two mounting holes for maximum track length positioning to the front and having more stability for a front track assembly as shown in FIG. 7, and FIG. 17. The two extra holes in the rear end of the leaf spring 56 are to allow the rear idler wheel 94 with its mounting shaft 83 to move back into the rear two mounting holes for maximum track length positioning to the rear and having more stability for a rear mounted track assembly as shown in FIG. 7, and FIG. 17.

As a total track assembly the driving cog wheel 37 is slipped onto the mounting shaft 31 by means of having a hexagon shape bore through its middle at its center hub 46. The same six sided hexagon shape of the mounting shaft 31 the thin wall hexagon sleeve 38 and the driving cog wheel 37 bore at hub 36 allows synchronized rotational movement between the hexagon shaft 31 and the driving cog wheels 37 without the need for a shear key and keyway. Longitudinal movement is prevented by the hexagon bore antifriction bearings 39 as they are set into cast tight fitting recesses in the top of the rigid frame beam 41 and the cast bearing cover 42. The mounting shaft 31 is attached through the hexagon shaped thin wall sleeve 38 and through the hexagon bore antifriction bearings 39 to the upper portion of the track supporting rigid frame beam 41.

Figure 12:
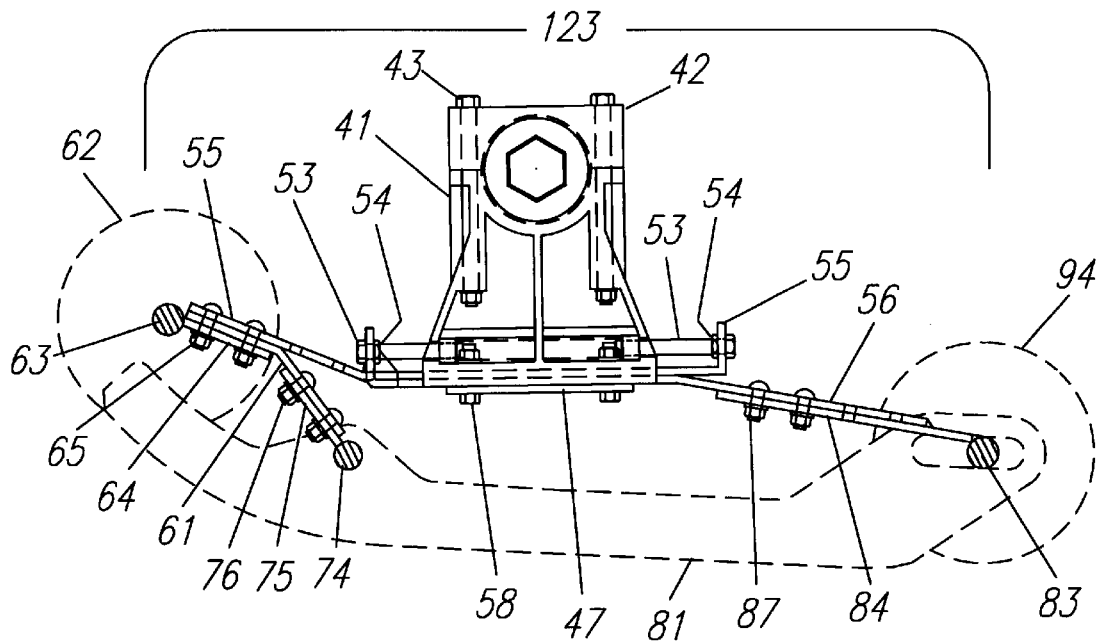
FIG. 12 is a side elevation of the spring beam assembly which accommodates the slider rub bars for the support of the lower intermediate course of the endless track.
Figure 13:
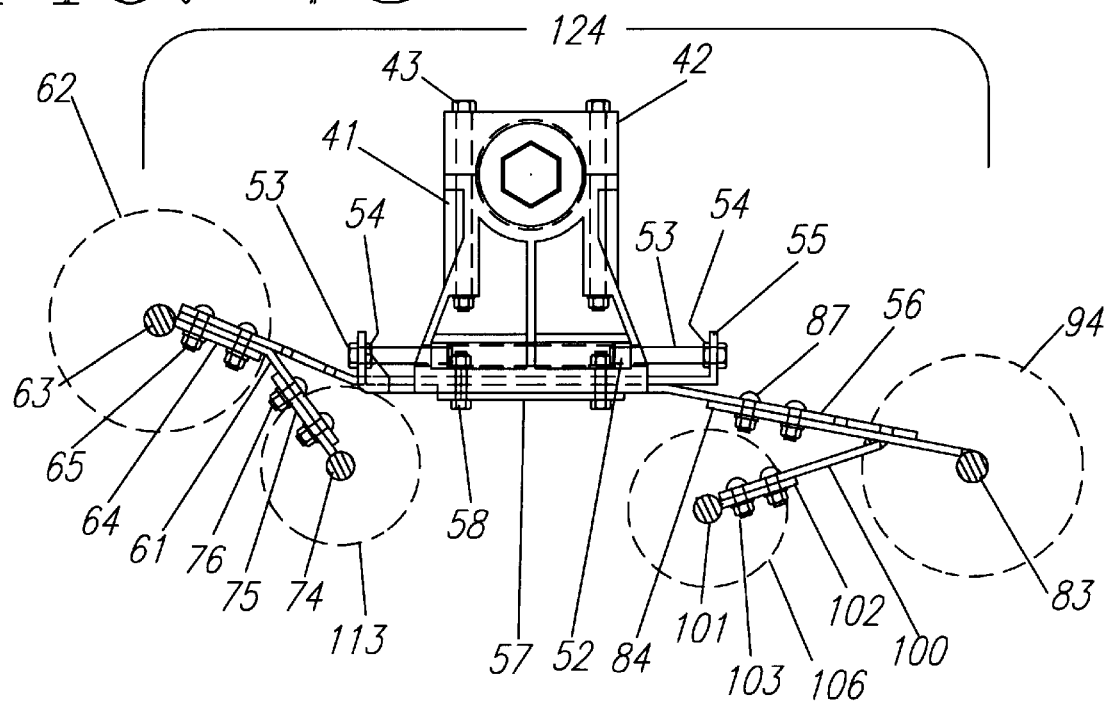
FIG. 13 is a side elevation of the spring beam assembly which accommodates the optional intermediate idler wheels for the support of the lower intermediate course of the endless track.
Figure 16:
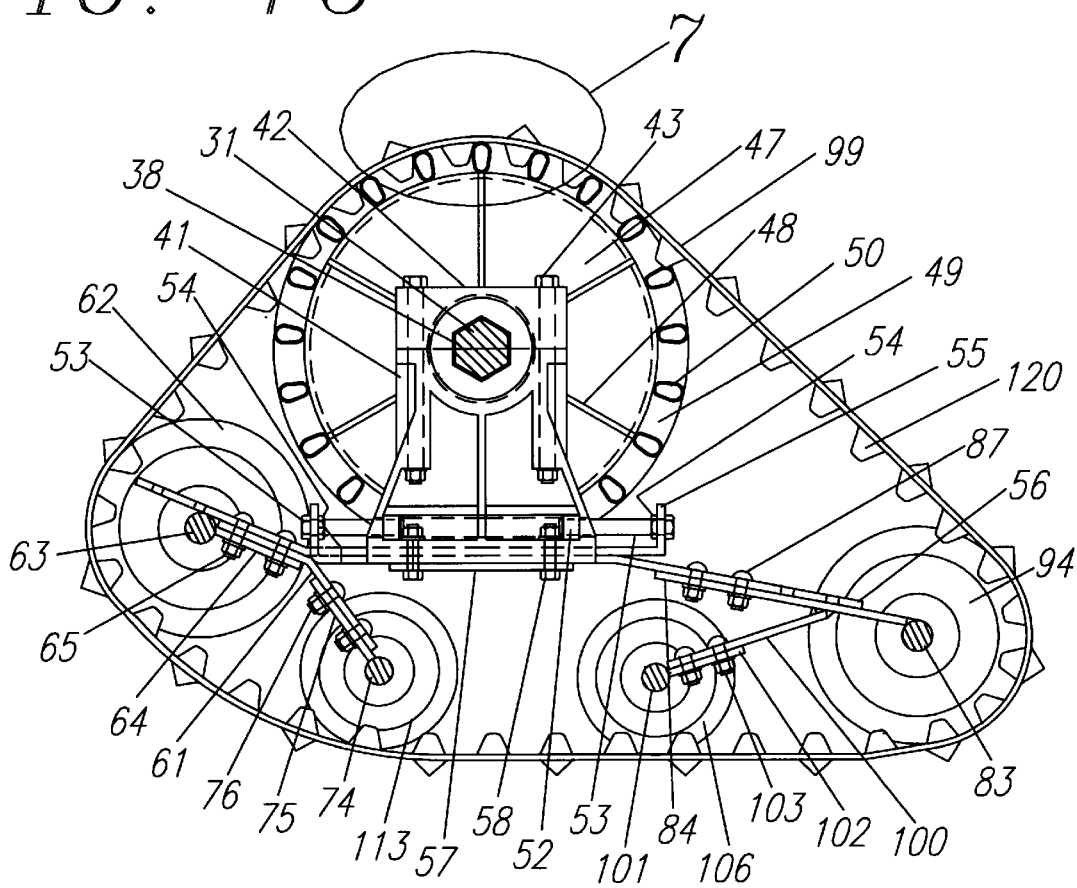
FIG. 16 is a side elevational section of the optional embodiment as taken along line 16—16 as shown in FIG. 15.

FIG. 12 shows the preferred flexible frame assembly 123, incorporating the centrally located rigid frame beam 41 with leaf spring extension 55 extending out to the bottom front and leaf spring 56 extending to the bottom rear for the flexible support of the slider rub bars 81 that maintains the downward orientation of the endless track 99. FIG. 13 shows the optional flexible frame assembly 124, incorporating the centrally located rigid frame beam 41 with leaf spring extension 55 extending out to the bottom front and leaf spring 56 extending to the bottom rear for the flexible support of the front intermediate idler wheels 113 and the rear intermediate idler wheels 106 that maintains the downward orientation of the endless track 99.

Figure 19:
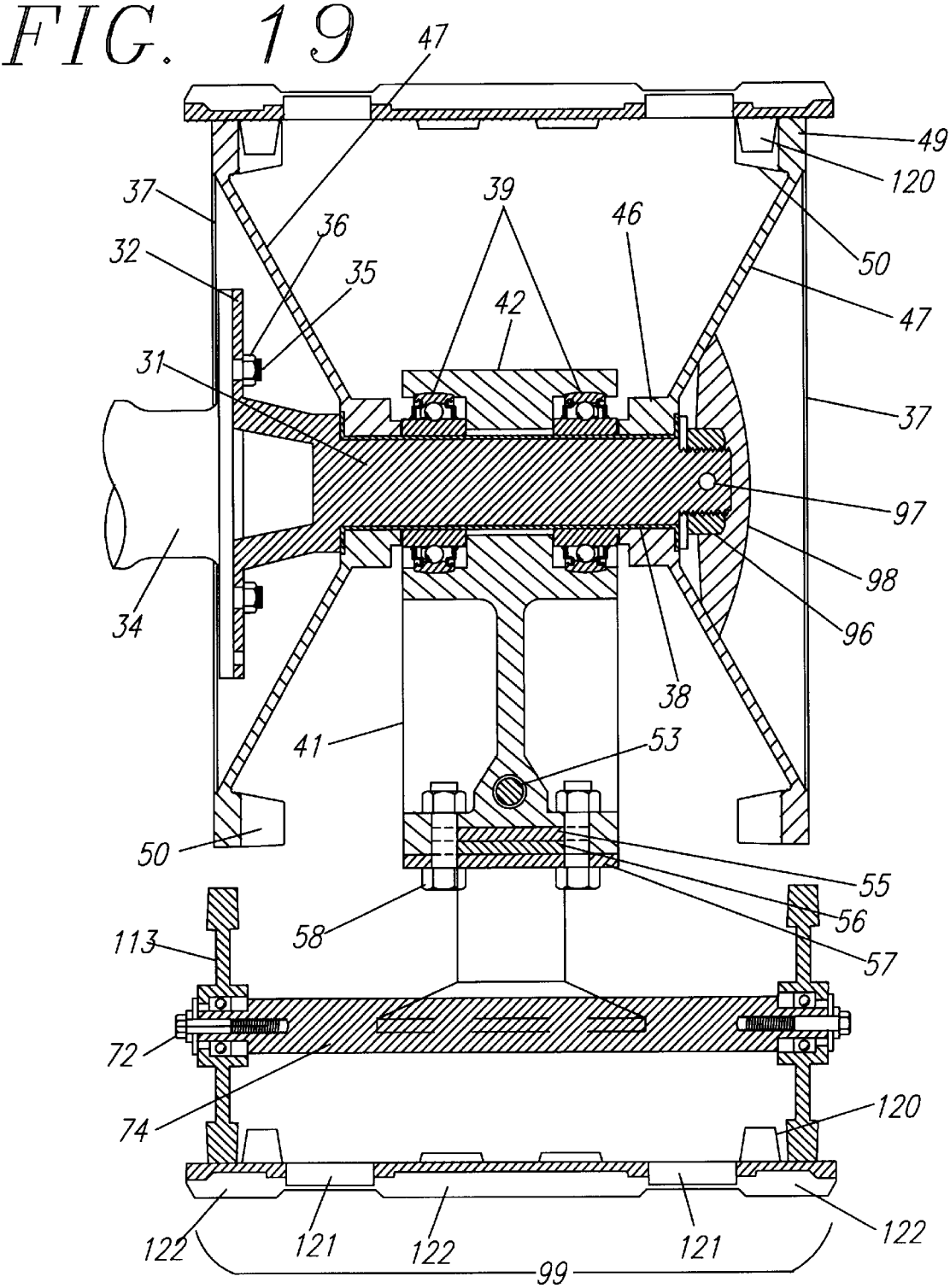
FIG. 19 is a vertical sectional view of the optional embodiment using intermediate idler wheels, as taken along the line 19—19 in FIG. 15.
Figure 20:
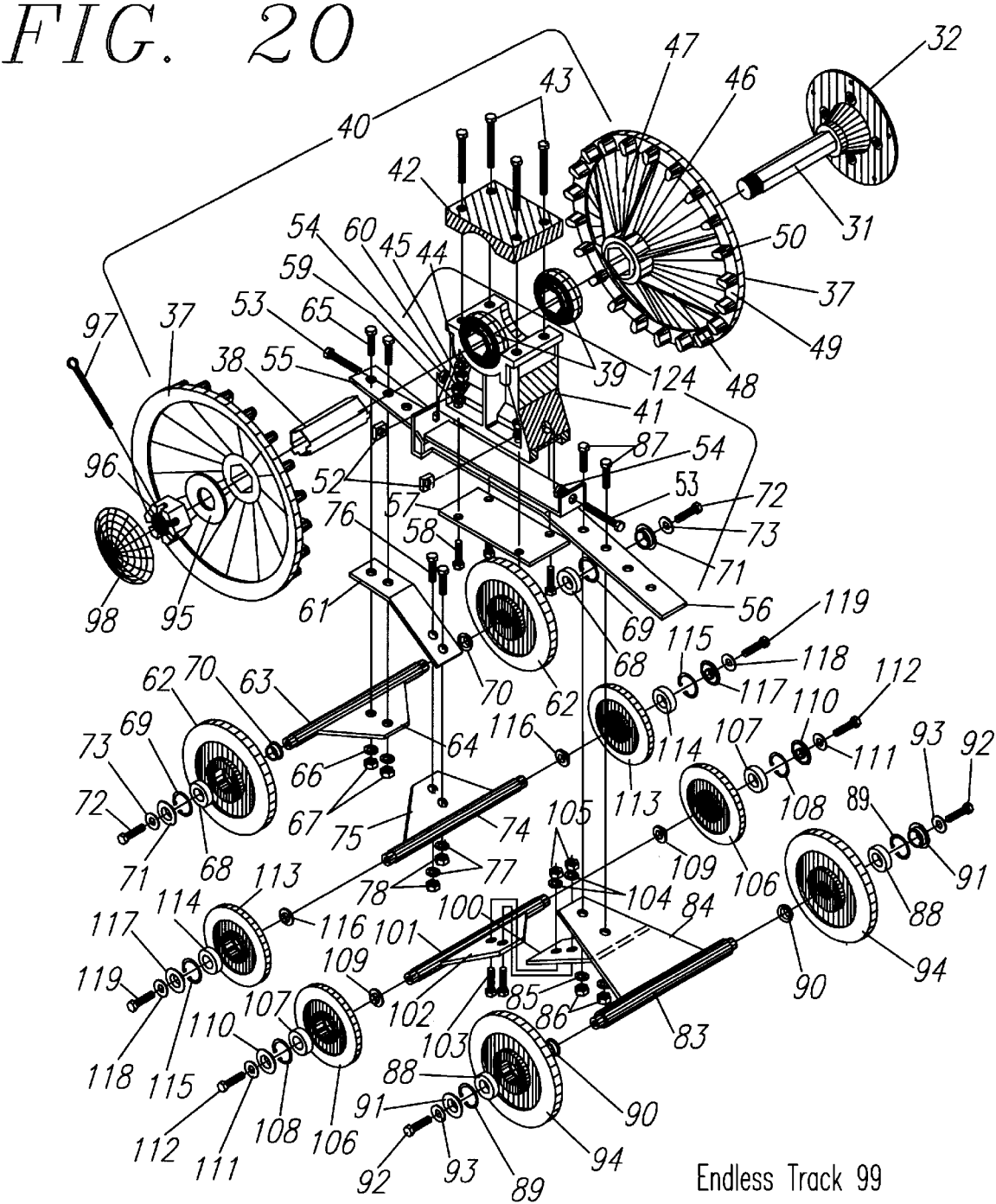
FIG. 20 is an exploded pictorial view of the optional embodiment using intermediate idler wheels, in the track assembly but does not show the endless track for clarity.

The endless track 99 is restrained from unwanted dismounting when making turns or lateral applied forces such as side hill traversing by the feature of the driving cog wheels 37 having the annular rim 49 making contact and supporting the top intermediate portion of the endless track 99 and the annular rim 49 running at the outward edge of the endless track 99, and restraining the endless tracks lugs 120 from lateral movement as shown in FIG. 10 and FIG. 19. The front idler wheels 62, optional intermediate idler wheels 106 and 113 and rear idler wheels 94 run in the same path as does the driving cog wheels annular rim 49 on the endless track 99. The slider rub bars run on the inside face of the endless track 99s lugs 120 as shown in FIG. 10 affording the same lateral restraint of the endless track from unwanted dismounting.

The endless track 99 is a standard length snowmobile endless track with diving lugs 120 located near its outer edges, multiple longitudinal continuous bands 122 and connecting transverse bands at spaced intervals as shown in FIG. 9, FIG. 10, FIG. 18 and FIG. 19.

The driving cog wheel sub assembly 40 is held onto the mounting shaft 31 by a hex slotted nut 96 threaded onto the end of the mounting shaft 31 with a cotter pin 97 inserted through a slot in the hex slotted nut 96, through the hole in the outboard end of the mounting shaft 31 for preventing unwanted loosening of the hex slotted nut 96. The hex slotted nut 96 has a soft elastomer molded snap-on cover 98 that gives a smooth snag free surface over the hex slotted nut 96 when installed on the mounting shaft 31. The track can be installed onto or removed from the mounting shaft 31 as an assembly with a minimum amount of tools and of time.

DRAWING REFERENCE NUMERALS WORKSHEET

PART NAME

- 30 Track Laying Attachment
- 31 Mounting Shaft
- 32 Mounting Flange
- 33 All-Terrain Recreational Vehicle
- 34 Wheel Hub
- 35 Projecting Studs
- 36 Hex Nuts
- 37 Driving Cog Wheel
- 38 Thin Wall Sleeve
- 39 Hexagon Bore Antifriction Bearing
- 40 Sub Assembly of 37, 38 and 39
- 41 Rigid Frame Beam
- 42 Top Cap
- 43 Bolts
- 44 Lock Washers
- 45 Hex Nuts
- 46 Driving Cog Wheel Hub
- 47 Solid Dished Web
- 48 Stiffening Ribs
- 49 Annular Stiffening Rim
- 50 Cog Projections
- 51 Bearing Surface
- 52 Square Nuts
- 53 Tension Adjusting Bolt
- 54 Hexagon Jamb Nut
- 55 Front Leaf Spring
- 56 Rear Leaf Spring
- 57 Clamp plate
- 58 Bolts
- 59 Lock Washers
- 60 Hex Nuts
- 61 Connecting Leaf Spring
- 62 Front Idler Wheels
- 63 Front Idler Shaft
- 64 Front Idler Shaft Mounting Plate
- 65 Bolts
- 66 Lock Washers
- 67 Hex Nuts
- 68 Antifriction Bearings
- 69 Snap Rings
- 70 Inner Spacer
- 71 Outer Spacer
- 72 Bolts
- 73 Flat Washers
- 74 Front Strut Shaft
- 75 Front Strut Shaft Mounting Plate
- 76 Bolts
- 77 Lock Washers
- 78 Hex Nuts
- 79 Bolts
- 80 Flat Washers
- 81 Slider Rub Bar
- 82 Polymer Plastic Slider Rub Surface
- 83 Rearward Idler Shaft
- 84 Rearward Idler Shaft Mounting Plate
- 85 Lock Washers
- 86 Hex Nuts
- 87 Bolts
- 88 Antifriction Bearings
- 89 Snap Rings
- 90 Inner Spacers
- 91 Outer Spacers
- 92 Bolts
- 93 Flat Washers
- 94 Rear Idler Wheels
- 95 Leaf Washer
- 96 Hexagon Slotted Nut
- 97 Cotter Pin
- 98 Molded Snap On Cover
- 99 Endless Track
- 100 Rear Intermediate Idler Extension Plate
- 101 Rear Intermediate Idler Shaft
- 102 Rear Intermediate Idler Mounting Plate
- 103 Bolts
- 104 Lock Washers
- 105 Hex Nuts -continued

DRAWING REFERENCE NUMERALS WORKSHEET

PART NAME

| | |
|---|---|
| 106 | Rear Intermediate Idler Wheel |
| 107 | Antifriction Bearings |
| 108 | Snap Rings |
| 109 | Inner Spacers |
| 110 | Outer Spacers |
| 111 | Leaf Washers |
| 112 | Bolts |
| 113 | Front Intermediate Idler Wheel |
| 114 | Antifriction Bearings |
| 115 | Snap Rings |
| 116 | Inner Spacers |
| 117 | Outer Spacers |
| 118 | Flat Washers |
| 119 | Bolts |
| 120 | Lugs |
| 121 | Endless Belt Band Openings |
| 122 | Endless Belt Bands |
| 123 | Flexible Frame |
| 124 | Optional Flexible Frame |

What is claimed is:

1. An endless track laying attachment for a vehicle comprising:

a rigid frame beam having a recess cut there into;

a multifaceted thin wall sleeve being received in said recess and having a multifaceted bore;

a pair of antifriction bearings having a multifaceted bore surrounding the thin wall sleeve and being received in said recess;

a multifaceted shaped mounting shaft being received in said multifaceted bore of the thin wall sleeve;

said multifaceted shaped mounting shaft being equipped with a flange on an inner end thereof, said flange containing mounting bolt holes and being attachable to and rotatable with the wheel hub of a vehicle, said mounting shaft having a threaded portion on an outer end thereof for quick mounting or dismounting of the attachment from the mounting shaft when attached to the vehicle;

a pair of driving cog wheels being mounted to an outer surface of the multifaceted thin wall sleeve for rotation therewith;

said rigid frame beam having a slot running longitudinally along a bottom face and receiving first and second longitudinally oriented resilient leaf spring members;

each of said resilient leaf spring members having a plurality of holes on one end.

2. The endless track laying attachment according to claim 1 further comprising:

a pair of spaced apart slider rub bars adjustably attached to the first and second leaf spring members.

3. The endless track laying attachment according to claim 1 further comprising:

a first pair of idler wheels mounted to the first resilient leaf spring member, and a second pair of idler wheels mounted to the second resilient leaf spring member.

4. The endless track laying attachment according to claim 1 further comprising:

a slotted nut being threadedly mounted to said threaded portion of the mounting shaft, said mounting shaft having a bore through the outer end thereof for receiving a cotter pin.

5. The endless track laying attachment according to claim 1 further comprising:

a plurality of tabs projecting from the inner and outer ends of the thin wall sleeve for retaining the driving cogs.

6. The endless track laying attachment according to claim 1 further comprising:

a cover fitted over the recess and attached to the rigid frame beam for retaining the antifriction bearings;

a clamp plate attached to a bottom surface of the rigid frame beam covering said slot and retaining said first and second leaf spring members.

7. The endless track laying attachment according to claim 1 further comprising:

a plurality of cog projections extending from inner surfaces of said driving cog wheels.

8. The endless track laying attachment according to claim 1 wherein:

said first resilient leaf spring includes a vertical bend with a hole therethrough;

a cast hole being formed in said rigid frame beam;

a tension adjustment bolt is passed through said hole in the first leaf spring and extends into the cast hole in the rigid frame beam, said bolt being adjustable by a plurality of nuts.

9. The endless track laying attachment according to claim 1 wherein:

said first resilient leaf spring includes a slot therethrough and said second resilient leaf spring extends through said slot in said first leaf spring.

10. The endless track laying attachment according to claim 9 wherein:

the second resilient leaf spring includes a vertical bend with a hole therethrough;

a second cast hole being formed in said rigid frame beam;

a second tension adjustment bolt is passed through said hole in the second leaf spring and extends into the second cast hole in the rigid frame beam, said second bolt being adjustable by a plurality of nuts.

11. The endless track laying attachment according to claim 1 wherein:

the first resilient leaf spring member extends forwardly and the forward end thereof is bent upwardly.

12. The endless track laying attachment according to claim 1 wherein:

the first resilient leaf spring member extends forwardly and the forward end thereof is bent upwardly, the second resilient leaf spring member extends rearwardly and the rear end thereof is bent downwardly.

13. The endless track laying attachment according to claim 2 wherein:

The slider rub bars each include a removable low coefficient of friction polymer plastic rub surface mounted to a lower surface thereof.

* * * * *